United States Patent [19]

Wachter et al.

[11] Patent Number: 4,889,681

[45] Date of Patent: Dec. 26, 1989

[54] APPARATUS FOR REDUCING FLOOR AND SEISMIC LOADINGS IN UNDERWATER STORAGE AREAS USED IN THE STORING OF SPENT NUCLEAR FUEL RODS

[75] Inventors: William J. Wachter, Wexford, Pa.; Anton A. Fuierer, Victor, N.Y.

[73] Assignee: U.S. Tool & Die, Inc., Pittsburgh, Pa.

[21] Appl. No.: 875,454

[22] Filed: Jun. 17, 1986

Related U.S. Application Data

[63] Continuation-in-part of Ser. No. 660,477, Dec. 7, 1984, Pat. No. 4,666,660, which is a continuation of Ser. No. 312,243, Oct. 19, 1981, abandoned.

[51] Int. Cl.⁴ .................. G21C 19/06; G21C 19/40
[52] U.S. Cl. .................................................. 376/272
[58] Field of Search .................. 376/272; 250/506.1, 250/507.1; 252/633

[56] References Cited

U.S. PATENT DOCUMENTS

| | | | |
|---|---|---|---|
| 3,935,467 | 1/1976 | Gablin | 252/633 |
| 4,029,968 | 6/1977 | Rubinstein et al. | 376/272 |
| 4,069,923 | 1/1978 | Blumenau et al. | 376/272 |
| 4,287,426 | 9/1981 | Anthony | 376/272 |
| 4,299,659 | 11/1981 | Hame et al. | 376/272 |
| 4,336,103 | 6/1982 | Katscher et al. | 376/245 |
| 4,525,324 | 6/1985 | Spilker et al. | 376/272 |
| 4,666,660 | 5/1987 | Wachter | 376/272 |

FOREIGN PATENT DOCUMENTS

| | | | |
|---|---|---|---|
| 0054968 | 6/1982 | European Pat. Off. | 376/272 |
| 2904362 | 8/1980 | Fed. Rep. of Germany | 376/272 |
| 2943455 | 5/1981 | Fed. Rep. of Germany | 376/272 |
| 3101540 | 8/1982 | Fed. Rep. of Germany | 376/272 |

Primary Examiner—Charles T. Jordan
Assistant Examiner—Daniel Wasil
Attorney, Agent, or Firm—Clifford A. Poff

[57] ABSTRACT

A storage system for the storage of nuclear waste material is disclosed. A storage system includes a plurality of storage canisters of dimensions allowing it to hold spent nuclear fuel rods and a rack structure for maintaining the storage canisters in a definite horizontal and vertical array. A storage system is of particular value for use in underwater nuclear waste storage areas. When used underwater, the system includes buoyant chamber positioned above the rack structure and flexibly connected thereto to provide an upper force to reduce the downward load exerted on a floor of the water pool by the storage canisters and the rack structure. The system thereby allows a far greater number of fuel rods to be stored in an underwater nuclear waste storage area than was possible in the past.

21 Claims, 3 Drawing Sheets

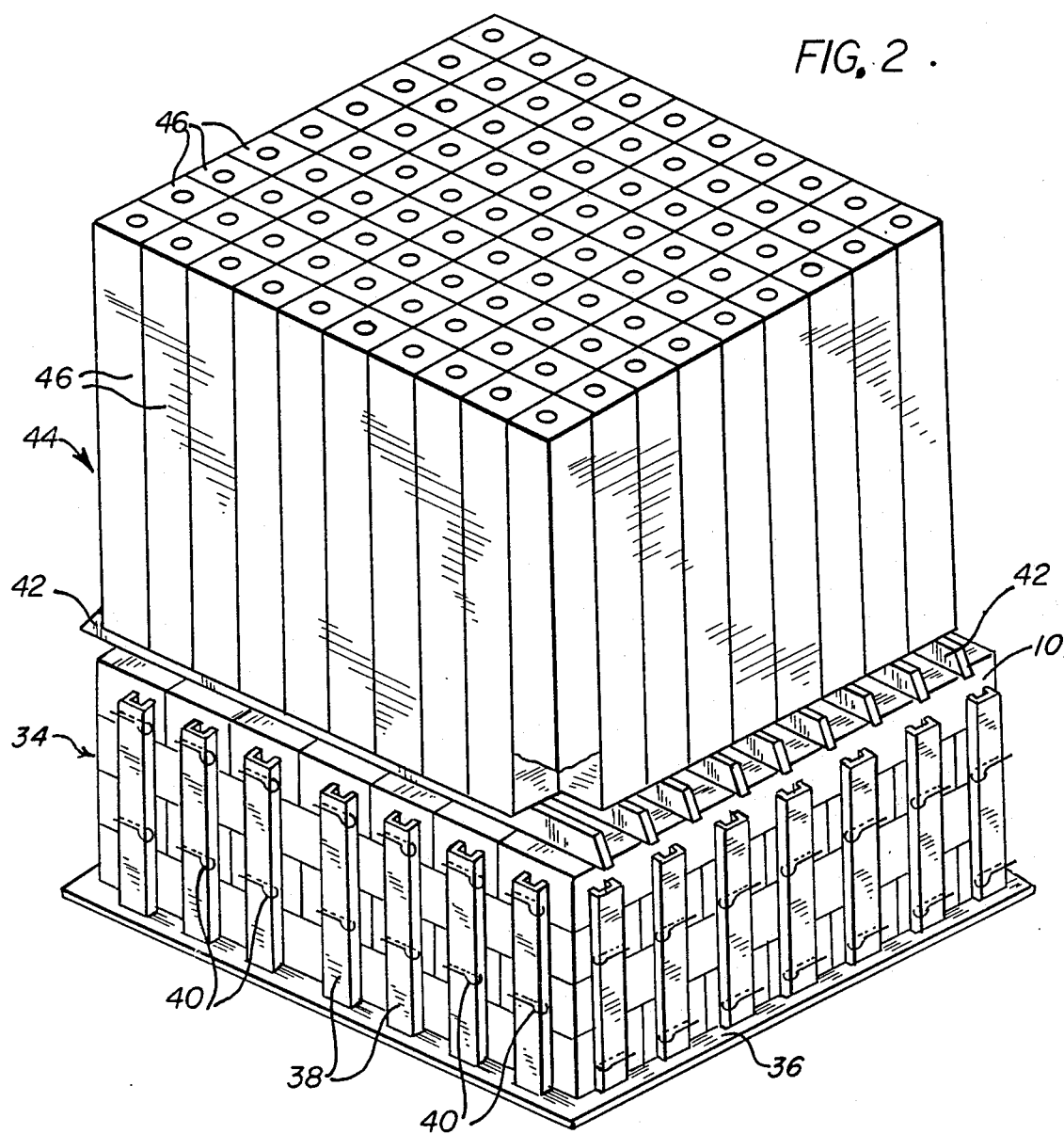

APPARATUS FOR REDUCING FLOOR AND SEISMIC LOADINGS IN UNDERWATER STORAGE AREAS USED IN THE STORING OF SPENT NUCLEAR FUEL RODS

This application is a continuation-in-part of application Ser. No. 660,477, filed Dec. 7, 1984, (now U.S. Pat. No. 4,666,660) which is a continuation of application Ser. No. 312,243, filed Oct. 19, 1981 (now abandoned).

BACKGROUND OF THE INVENTION

1. Field of the Invention

The invention relates generally to nuclear waste storage systems and, more particularly, to a system for increasing the storage capacity of a water pool used for the storage of spent nuclear fuel rods.

2. Description of the Prior Art

Spent nuclear fuel rod assemblies, once removed from the nuclear reactor core, are normally stored in underwater storage areas in specifically designed storage racks for sufficient periods of time to permit the residual reactivity of the nuclear fuel contained therein to dissipate, or until the spent fuel rod assemblies are withdrawn from the pool for transportation to a spent fuel recovery facility. The fuel rods are metal pipes which are filled with nuclear fuel material and are typically 0.4-0.6 inches in diameter and 8 to 15 feet in length. Groups of 64, 128, or more such rods are confined within a fuel rod assembly while they are in a nuclear reactor and subsequently while they are stored in the underwater storage area. It is a normal practice to provide empty spaces in the storage rack between the spent fuel rod assemblies to preclude any unattended temperature increase within the underwater storage area. When an underwater storage area has been filled with spent fuel rod assemblies in such a manner, there is no space remaining within the storage area for additional spent fuel rod assemblies.

Increasing the density of the material stored in the underwater storage area allows a greater amount of nuclear waste material to be stored in the limited available space of the underwater storage area. To accomplish this end, it has been proposed to withdraw the spent fuel rods from the assembly in which they have a normal spacing and to compact the spent fuel rods in a canister in which the fuel rods are compacted in tighter spaces. The more compact spent nuclear fuel rods do not present the same tendency for temperature increase and can be stored in adjacent and contiguous spaces in a storage rack, thereby increasing the storage capacity of an existing storage rack three-fold.

A factor limiting the increase of the storage capacity in the underwater storage areas is the possibility that the loading capacity of the floor (usually concrete) of the storage area may be exceeded by such increased storage. Additionally, because it is essential to maintain the spent fuel rods under at least 10 feet of water at all times, including those times when the spent fuel rods are being transferred from their fuel rod assemblies into a compacted fuel rod canister, typical underwater storage areas are about 45 feet deep. This water further increases the loading exerted on the floor. The floor loading, therefore, is the weight of the 45 foot deep volume of water in the storage area and the contained storage rack and spent fuel rod canister.

It has been further proposed to position buoyant chambers above the storage rack containing spent fuel rod containers, and attaching the chambers thereto. See copending U.S. Pat. Application Ser. No. 660,477 filed on Dec. 7, 1984 by W. J. Wachter.

It is possible, therefore, to increase the storage capacity of the underwater storage areas through use of such buoyant chambers, while not endangering the structural integrity of the storage area. A further increase in the density of the materials stored in the underwater storage area, would allow additional nuclear waste material to be stored in the existing storage area.

It is, therefore, an object of the present invention to provide a system for maximizing the packing density of spent fuel rod canisters while minimizing the load which is applied to the floor of an underwater storage area for spent nuclear fuel rod storage.

It is a further object of the present invention to provide a spent fuel rod canister which requires the minimum amount of support from a storage rack, thereby maximizing the available storage capacity of an underwater storage area.

SUMMARY OF THE INVENTION

In accordance with the present invention, a storage system for increasing the storage capacity of an area used for the storage of spent nuclear fuel rods is provided The system comprises a plurality of storage canisters for holding the spent nuclear fuel rods and a rack structure positioned therebelow for holding the plurality of storage canisters in a specified configuration. In an embodiment in which the storage area is under water in a spent fuel water pool, a buoyant chamber for producing an upward force is positioned above the rack structure and flexibly connected thereto to thereby reduce the downward load on the floor of the spent fuel water pool which is exerted by the storage canisters and the rack structure.

In one embodiment, the storage canister comprises a rectangular body of a length great enough to allow spent nuclear fuel rods to be stored therein. An optional divider plate positioned at the center of the rectangular body and extending downwards through the body, provides additional support and heat dissipation support for the canister as well as aiding in directing the spent fuel rods in compacted form to the canister. A top cover and a bottom cover are fastened by a fastening means to the rectangular body and is sealed against a rectangular body by a sealing means, such as a rubber gasket. The fastening means may be, for example, a bolt fastened at the center of each cover to tie rods extending from the rectangular body.

In a further embodiment, bales consisting of pairs of clevices are attached to each of the covers to allow attachment of an external tool to allow the storage canister to be moved and to allow attachment to the rack structure. Additionally, valves may be attached to extend through the top and bottom covers, respectively, to allow external venting of the canisters.

By placing the spent fuel canisters in the rack structure in such a manner that the longitudinal direction of the canisters is in the horizontal plane, the canisters may be stacked upon one another, thereby becoming essentially self-supporting, and thereby simplifying the design requirements of the rack structure. The rack structure may comprise a rectangular base of such dimensions as to allow a series of storage canisters to be placed horizontally on the base parallel to one another, and a series of vertically-extending side rails positioned around the periphery of the base to maintain a position of the storage canisters as they are stacked upon the base. Connecting the top ends of the side rails of two opposing sides of the base is a series of metal planks. The metal planks contain attaching means located on the top sides thereof for attachment to the buoyant chamber. The buoyant chamber provides an upward force which acts in a direction opposite to the downward force exerted on the water pool floor by the storage canisters and the rack structure. By providing storage canisters which, when stacked upon one another, are essentially self-supporting, the complexity and weight of the rack structure is minimized, thereby allowing more storage canisters to be stored in the water pool. Fasteners, such as removable shear pins, interconnect ends of the storage canister with the side rails.

BRIEF DESCRIPTION OF THE DRAWINGS

FIGS. 2 and 2A are a schematic view, and an enlarged view of a portion thereof, respectively, of the storage system for the storage of spent nuclear fuel rods according to the teachings of the present invention.

DESCRIPTION OF THE PREFERRED EMBODIMENT

Figure 1:
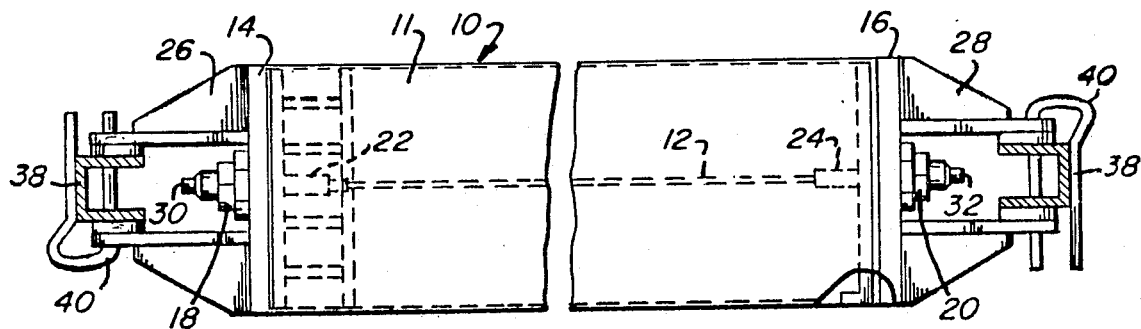
FIG. 1 is a cross-sectional view illustrating a storage canister used for storing nuclear fuel rods in compacted form according to the teachings of the present invention.
Figure 3:
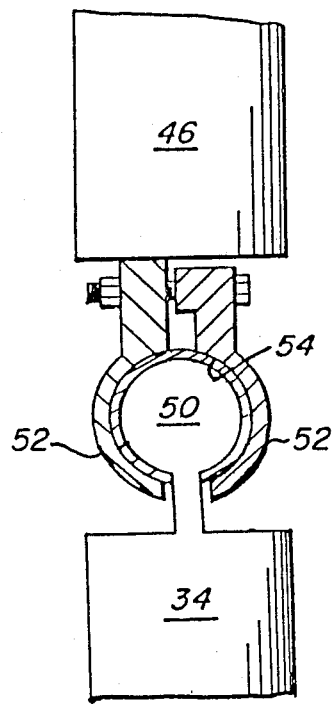
FIG. 3 is an enlarged sectional view illustrating a ball and socket joint to interconnecting buoyant chambers with the storage canisters.

Referring now to FIG. 1, there is shown a storage canister 10 for the storage of spent fuel rods. The canister 10 comprises a rectangular body 11 with a length greater than the fuel rod, allowing the fuel rods to be enclosed therein. A divider plate 12 extends along the center of the canister 10 to improve structural strength, improve heat conductivity, and to act as a tie plate. The outer envelope of the canister 10 has dimensions which are the same as an unconsolidated fuel assembly and contain fuel rods from two fuel assemblies with fuel rods from one fuel assembly on one side of the divider plate 12 and fuel rods from a second fuel assembly on the other side of the divider plate 12. The weight of the canister 10 including the spent fuel rods is approximately 1 ton, a weight quite easily moved, both underwater in a spent fuel water or external to the pool by conventional transporting means. The canister 10 contains a top cover 14 and a bottom cover 16 which are mechanically sealed and fastened to the rectangular body 11 such that the covers 14 and 16 may be quickly removed. Fastening of the top cover 14 and bottom cover 16 to the rectangular body 11 is accomplished by use of bolts 18 and 20 in the center of the lid which connect to tie rods 22 and 24. Such a fastening means allows repackaging of fuel utilizing relatively simple devices and little time. Such a fastening means, furthermore, allows the storage canister 10 to be sealed or opened at either end, and by means of the valves 30 and 32 provides the ability to change internal atmosphere of the canister 10 and the ability to maintain a specific environment therein (i.e., water, air, inert gas, etc.). The storage canister 10 may be stored under water or above water and the environment may be tailored to keep fuel temperatures well below levels leading to oxidation or cladding. The canister 10 provides the ability to isolate the fuel rods located therein from the surrounding environment.

Top cover 14 and bottom cover 16 are designed with outwardly extending, tapered bales 26 and 28, identical on both ends. The bales 26 and 28 which consist of outwardly extending pairs of clevises allow a simple "universal tool" to be attached to either one or both ends of the canister 10. The tool can pivot to any angle from 0 degrees to 120 degrees from the longitudinal axis of the canister 10, thereby enabling one to lay down the canister 10 in a horizontal position from one end, attach another tool to the other end and move the canister 10 horizontally.

The top cover 14 and bottom cover 16 contain valves 30 and 32 threaded into the cover, respectively, which may be left opened, or closed or which may be removed or installed as required, may be used to attach lines or vents. The canister may also accommodate a fine mesh screen (not shown) to isolate particulates while maintaining fluid flow therethrough, if fluid flow is required. The valves 30 and 32 can be, when desired, check valves. The bales 26 and 28 act further to serve as a guard around the valves 30 and 32, respectively, as well as serving as shock absorbers in a dropped canister 10 mishap.

Most important, however, for the system of the present invention, is the structural design of the rectangular body 11 of the canister 10 which allows canisters 10 to be placed on their sides and stacked one upon another. This, thereby, allows the canisters 10 to act as an integral part of a rack during storage.

Figure 2A:
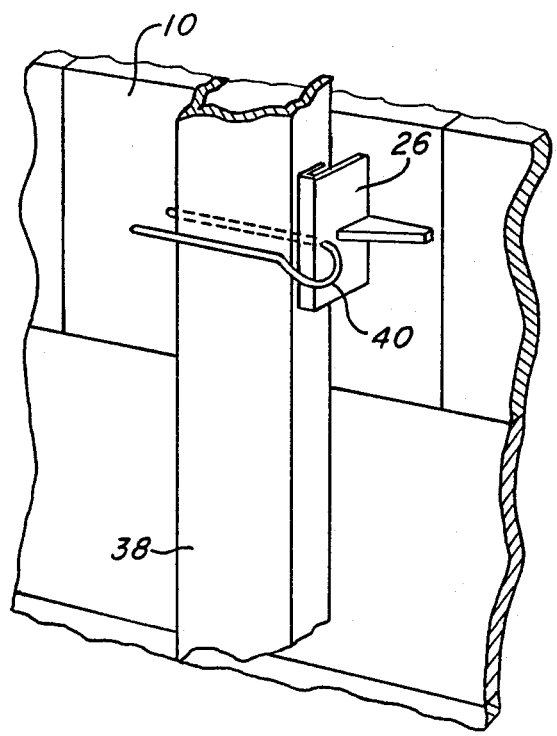

Turning now to FIGS. 2 and 2A, there is shown the storage system of the present invention. The storage system includes storage canisters 10 as an integral element thereof. Because the canisters 10 are essentially self-supporting when placed in a horizontal position and stacked upon one another, the rack structure shown generally as 34, is of a relatively simple design. The rack structure 34 comprises a base plate 36 of a both lengthwise and width-wise dimensions greater than the lengthwise dimension of the storage canisters 10. This allows the storage canisters 10 to be placed on the base plate 36 with the longitudinal directions thereof extending along either the length or the width of the base plate 36.

In the preferred embodiment, a first row of canisters 10 is positioned side-by-side on the base plate 36 with the longitudinal direction of the canisters 10 extending in a direction parallel to the lengthwise direction of the base plate 36. A series of vertically extending U-shaped side rails 38 positioned around the periphery of the base plate 36 and attached thereto are engaged with the bales 26 and 28, respectively, of the canisters 10 by shear pins 40 extending therethrough to maintain the rows of canisters 10 in a fixed position. The connection of a single canister 10 to a side rail 38 through bails 26 and 28, and sheer pin 40 is illustrated in the enlarged view of FIG. 2A. For purposes of clarity, bails 26 and 28 are not shown in FIG. 2. It is to be understood, however, that the connection of both ends of each canister 10 to side rails 38 are as illustrated in FIGS. 1 and 2A. Thereafter, a second row of canisters 10 are positioned side-by-side upon the first row of canisters with the longitudinal direction of the second row of canisters 10 extending in a direction parallel to the width-wise direction of the base plate 36. The longitudinal direction of the second row of canisters 10 are, thus, at an angle perpendicular to the longitudinal direction of the first row of canisters 10. The bales 26 and 28 of the second row of canisters 10 are engaged with the vertically-extending side rails 38 by shear pins 40 (such connection being shown in the enlarged view of FIG. 2A) to similarly maintain the second row of canisters 10 in a fixed position. Similarly, additional rows of canisters 10 may be stacked upon the second and, succeeding rows of canisters 10.

If, for example, the fuel rod assemblies from which the fuel rods have been extracted contained an 8×8 array of fuel rods, each storage canister 10 will contain 128 fuel rods. If each row of canisters 10 consists of 8 storage canisters, and 8 rows of canisters are stacked one upon another, the storage system of the present invention will store up to 8,192 fuel rods.

Once each storage canister 10 has been positioned and engaged with the side rails 38 by shear pins 40, a series of planks 42 having a length similar to the length of the base plate 36, are attached to the vertically-extending side rails 38 at the top ends thereof on two opposing sides of the periphery of the base plate 36. Mounted on the top sides of each of the planks 42 is a plurality of attaching means for attaching to a buoyant chamber 44. In the preferred embodiment, the buoyant chamber 44 is comprised of a plurality of individual buoyant cells 46, each individually attached to the planks 42. The buoyant cells 46 are fabricated from metal, preferably stainless steel, although aluminum alloys or other metals may be used as materials of construction. In a typical embodiment, each buoyant cell 46 is about 8 inches square and 15 to 20 feet long. In another embodiment, each buoyant cell 46 is 16 or 17 inches square and 15 to 20 feet long. The buoyant cells 46 are water tight and, therefore, may be filled with a gas or other buoyant material in order to provide an upward force to counteract the downward force of the storage canisters 10 and the rack structure 34. The weight of water displaced from the pool by the introduction of the buoyant cells corresponds to the reduction of the apparent load applied to the pool floor by the water in the pool.

The attaching means attaching the planks 42 to the buoyant cells 46 in the preferred embodiment as shown in Figures, is a ball and socket connection. A ball 50 and a socket 52 are rigidly secured to a buoyant cell 46 and the rack structure 34, respectively, and friction pads 54 engaged with the spherical surface of the ball to absorb energy when the buoyant chamber moves relative to the rack structure. Such a connection allows movement of the buoyant cells 46 relative to the rack structure 34, such movement similar to an inverse pendulum movement. Such movement is important for the dampening function provided thereby in the event of seismic activity.

In contrast to earlier underwater storage systems, there is no need for space between storage canisters for the purpose of accommodating structure of a fuel storage rack. Thus, according to the present invention, the storage canisters form part of the storage rack structure. It is anticipated that the thermal conductivity through rod to rod, rod to can, and can to can contact encountered as a result of horizontal storage will enhance transfer of internal heat to the outside environment. Heat may be transferred from within the stack by several means as necessary. First maximum heat transfer may be accomplished by opening valves at each end of the canister to allow coolant circulation thru the canister. Second, small spaces may be left between canister rows for coolant circulation (not every row) as necessary, and third, canisters containing compacted fuel rod assembly skeletons, are interspread with fuel containing canisters in a ratio of 5:1 to act as heat sinks to transmit heat to the surrounding environment.

While the present invention has been described in connection with the preferred embodiment shown in FIGS. 1 and 2, it is understood that other similar embodiments may be used or modifications and additions thereof may be made to the described embodiment for performing the same functions of the present invention without deviating therefrom. For example, the stacks of rows of storage canisters 10 need not be positioned perpendicular to one another as disclosed in the preferred embodiment, but may be stacked upon one another with the longitudinal directions thereof pointing in the same direction. Therefore, the present invention should not be limited to any single embodiment, but rather construed in breadth and scope in accordance with the recitation of the appended claims.

We claim as our invention:

1. A storage system for the storage of nuclear waste material, including:
    a plurality of storage canisters having a longitudinal length great enough to hold spent nuclear fuel rods, with said storage canisters being stacked upon one another and side-by-side thereby creating a horizontal and a vertical array of said storage canisters;
    a rack structure for maintaining said storage canisters in said horizontal and vertical arrays said rack structure including; a horizontal base of lengthwise dimensions greater than the lengthwise dimensions of said storage canisters for positioning beneath said plurality of storage canisters; and
    a series of vertically extending said rails attached around the periphery of said horizontal base for engaging the ends of said storage canisters.

2. The storage system of claim 1 wherein said storage canisters comprise:
    a rectangular body with the longitudinal length thereof greater than the length of said spent nuclear fuel rods, with said rectangular body containing a top end and a bottom end at the opposite ends thereof;
    a divider plate including tie rods at the ends thereof positioned at the center of said rectangular body and extending along the longitudinal length thereof;
    a top cover and a bottom cover fastened to said rectangular body for covering said top end and said bottom end, respectively; and
    a sealing means for providing a controllable atmosphere in said rectangular body by sealing said top cover and said bottom cover, respectively, to said rectangular body.

3. The storage system of claim 2 wherein said storage canisters further include a first pair of outwardly extending clevices attached to said top cover, a second pair of outwardly extending clevices attached to said bottom cover, and means for attachment of said clevices to said rack structure.

4. The storage system of claim 2 wherein said storage canisters further include bolts engaging said tie rods for fastening said top cover and said bottom cover to said rectangular body.

5. The storage system of claim 2 wherein said top cover and said bottom cover include a first valve and a second valve, respectively, attached therethrough to allow external venting of said storage canister.

6. The storage system of claim 1 wherein said horizontal base further includes a width-wise direction greater than the lengthwise dimensions of said storage canisters.

7. The storage system of claim 1 wherein said side rails are spaced apart.

8. The storage system of claim 7 wherein said storage canister includes clevices extending outwardly from opposite ends thereof, said clevices including portions extending into gaps between the side rails.

9. The storage system of claim 1 wherein waste canisters are interposed between selected ones of said storage canisters, said waste canisters containing compacted spent fuel rod assembly skeletons.

10. An underwater storage system for the storage of nuclear waste material in a water pool, including:
   a plurality of storage canisters having a longitudinal length great enough to hold spent nuclear fuel rods, with said storage canisters being stacked upon one another and side-by-side thereby creating a horizontal and a vertical array of said storage canisters;
   a rack structure for maintaining said storage canisters in said horizontal and vertical arrays; and
   a buoyant chamber comprised of a plurality of buoyant cells positioned above said rack structure and connected thereto for reducing the downward load on a floor of the water pool by an amount equal to the weight of water displaced from the water pool by the buoyant chamber.

11. The storage system of claim 10 wherein said storage canisters comprise:
   a rectangular body with the longitudinal length thereof greater than the length of said spent nuclear fuel rods, with said rectangular body containing a top end and a bottom end at the opposite ends thereof;
   a divider plate including tie rods at the ends thereof positioned at the center of said rectangular body and extending along the longitudinal length thereof;
   a top cover and a bottom cover fastened to said rectangular body for covering said top end and said bottom end, respectively; and
   a sealing means for providing a controllable atmosphere in said rectangular body by sealing said top cover and said bottom cover, respectively, to said rectangular body.

12. The storage system of claim 10 wherein said storage canisters include outwardly extending clevices attached to each of opposite ends of the storage canisters and a means for attachment of said clevices to said rack structure.

13. The storage system of claim 11 wherein said storage canisters further include bolts engaging tie rods for fastening said top cover and said bottom cover to said rectangular body.

14. The storage system of claim 13 wherein said top cover and said bottom cover include a first valve and a second valve, respectively, attached therethrough to allow external venting of said storage canister.

15. The storage system of claim 10 wherein said rack structure includes:
   a horizontal base of lengthwise dimensions greater than the lengthwise dimensions of said storage canisters for positioning beneath said plurality of storage canisters;
   a series of vertically extending side rails attached around the periphery of said base plate for engaging the ends of said storage canisters;
   a series of horizontally positioned planks of lengthwise dimensions equal to the lengthwise dimension of said base plate, said planks fixedly connected to the top ends of said side rails of two opposing ends of said base plate; and
   a plurality of attaching means mounted on the top surfaces of said planks for attachment to said buoyant chamber.

16. The storage system of claim 13 wherein said horizontal base further includes a width-wise direction greater than the lengthwise dimensions of said storage canisters.

17. The storage system of claim 15 wherein said attaching means includes rigid ball and socket joints, thereby allowing relative motion of said buoyant chamber above said rack structure.

18. The storage system of claim 17 wherein said rigid ball and socket joints have friction pads engaged with the spherical surfaces of the balls to absorb energy as said buoyant chamber moves relative to said rack structure.

19. The storage system of claim 15 wherein said side rails are spaced apart.

20. The storage system of claim 19 wherein said storage canister including clevices extending outwardly from opposite ends thereof, clevices have portions extending into gaps between the side rails.

21. The storage system of claim 10 wherein waste canisters are interposed between selected ones of said storage canisters, said waste canisters containing compacted spent fuel rod assembly skeletons.

* * * * *